Oct. 6, 1959   R. W. KENNEY   2,907,340
VALVE MECHANISM FOR DIVERSE FLUIDS
Filed Aug. 6, 1954

INVENTOR
ROBERT W. KENNEY
BY
D. Gordon Angus
ATTORNEY.

United States Patent Office 2,907,340
Patented Oct. 6, 1959

2,907,340

VALVE MECHANISM FOR DIVERSE FLUIDS

Robert W. Kenney, South Pasadena, Calif., assignor to Stanley G. Harwood, South Pasadena, Calif.

Application August 6, 1954, Serial No. 448,328

7 Claims. (Cl. 137—188)

This invention relates to a valve for separating fluid of different densities which are contained in a common tank.

An object of the invention is to provide a separator valve for such uses as draining sump water from a tank which also contains liquid hydrocarbons, for example, and for other applications where fluids of different specific gravity are to be separated by draining off the lower heavier fluid. A related object is to provide such a valve which will operate automatically, which has a minimum of moving parts, and in which the differential pressure required for its operation is substantially independent of the absolute pressure of the fluids. While the example given in this specification is that of separating two liquids, the invention is also applicable to the separation of two fluids, only one of which is a liquid. An example of this latter is the drainage of water from an air compressor tank.

This invention is carried out by providing a casing having a cavity therein. A moveable diaphragm extends across the cavity so as to divide it into two chambers. An inlet is provided for each of the chambers, and an outlet is provided for one of them.

According to a feature of this invention, the diaphragm is so disposed and arranged as to close the outlet when the pressures in the chambers are substantially equal, and to move so as to open the outlet when the pressure in the chamber having the outlet is somewhat greater than in the other chamber.

When the chamber having the outlet is connected to a lower region in a tank so as to receive heavier fluid that settles, and the other chamber is connected to a higher region in a tank so as to receive less dense fluid, then the pressures in the two chambers will differ from each other according to the difference in specific gravities of the fluid columns from the tank to the chambers, and thus according to the quantity of the more dense fluid which is present. The greater differential pressure in one chamber than in the other displaces the diaphragm and opens the outlet.

An additional feature of this invention resides in positioning the outlet between the centroid of area of the diaphragm and the chamber wall so that the diaphragm can be lifted from the outlet by a tilting action instead of by a direct lift of the entire diaphragm, thereby reducing the differential pressure required to operate the valve.

Figure 1:
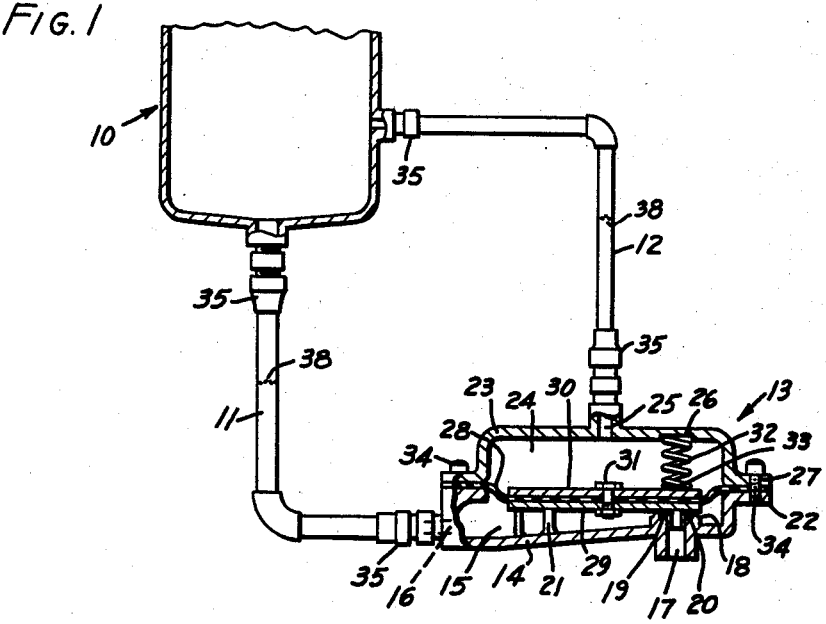
Figure 2:
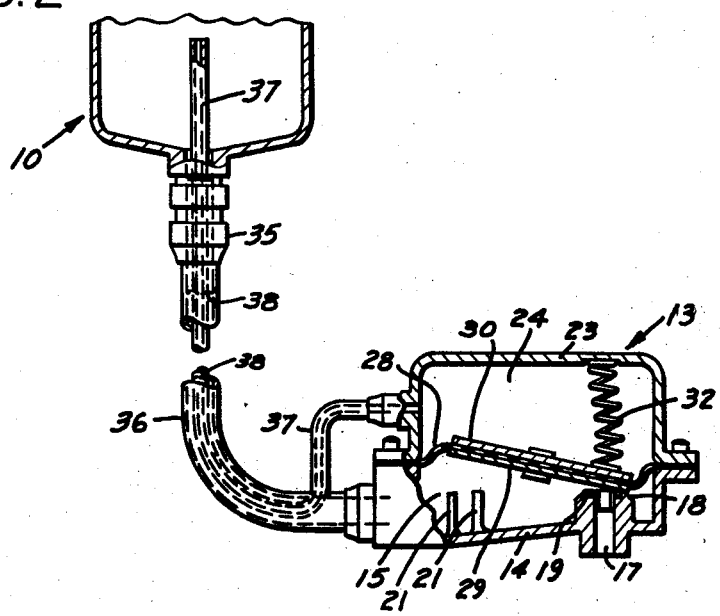

The above and other features of the invention will be fully understood from the following detailed description and the accompanying drawings, of which:

Fig. 1 is an elevation, partly in cross-section showing a separator valve according to the invention connected to a tank; and Fig. 2 is an elevation, partly in cross-section, showing another means for installing the same valve.

With particular reference to Fig. 1, there is shown a tank 10, such as a gasoline storage tank, in which a liquid of different and greater specific gravity than gasoline, such as water, may occasionally gather and sink to the bottom. A drain line 11 is provided at a bottom region of the tank so that the heavier liquid can be withdrawn. A stand pipe 12 is attached to the side of the tank so as to communicate with the inside of the tank at a level above the drain line and beneath the surface of the stored liquid. It will be observed that the stand pipe is disposed so as to terminate at a point above the anticipated level of the heavier liquid.

A separator valve 13 according to this invention includes a lower casing section 14 with a cavity for forming a first chamber 15. Section 14 includes an inlet 16 and an outlet 18. Outlet 18 rises in the first chamber and has an opening 17 in its upper end.

A ring groove 19 is formed in the top of the outlet around the drain port, to hold an O ring 20 therein. The O-ring is sometimes called a washer. Part of this O ring projects above the top of the outlet. It may conveniently be made of nylon, Teflon, or any other resilient O ring material which is resistant to the liquids in the tank. It will be observed that the outlet is provided thereby with a facing of resilient sealing material whereby when the diaphragm makes contact with the outlet, it engages the said facing so as to seal and close off the outlet.

Two leveling supports 21 rise into the lower chamber for purpose later to be described. Thread tapped bolt receptacles 22 are sunk into the lower case section around its edge.

An upper casing section 23 adapted for joining with the lower case section has a cavity that forms an upper second chamber 24 therein, and an inlet 25 through the side thereof which connects with the upper chamber. A spring receptacle 26 is sunk into the top of the upper chamber. Bolt passages 27, aligned with bolt receptacles 22, are drilled through the upper case section around its edge.

A flexible, moveable diaphragm 28, which is substantially impervious to liquids, and is resistant to the liquids in the tank, is disposed between the two case sections so as to be held at its edge when the case sections are joined. Nylon fabric embedded and bonded within a rubbery material such as rubber or synthetic rubber material is a useful material for this diaphragm when hydrocarbons such as gasoline are stored, and the heavier material separated is water. Backing members, or stiffening members in the form of a diaphragm washers are provided to strengthen the diaphragm and provide the diaphragm with a stiffened portion. A brass washer 29 is provided in the lower chamber, and an aluminum washer 30 in the upper chamber. These are disposed on opposite sides of the nylon diaphragm, and are joined together by a fastener 31 such as a nut and bolt to form the completed diaphragm assembly. The backing members may be made of any desired materials which are resistant to the liquids being handled, there being other suitable materials of construction.

It will be recognized that this diaphragm assembly serves to divide the cavity within the joined case sections into the described upper and lower chambers.

The stiffened portion of the diaphragm is connected to the interior wall of the cavity by the flexible portion of the diaphragm which surrounds it. The stiffened portion is thereby spaced from the interior wall of the cavities which define the chambers. The stiffened portion abuts the outlet to close the opening at a location on the diaphragm which is spaced a substantial distance from the centroid. This location lies between the centroid of the diaphragm and the wall. The stiffened portion is free to move toward chamber 24 at least at all points of the stiffened portion which are significantly spaced from the outlet and from the wall.

At least a major part of the initial movement of the diaphragm is a tilting one that is caused by a moment of force on the diaphragm around the outlet. This moment of force arises by virtue of the spacing between the outlet and the centroid. The stiffened portion thereby acts like a lever pivoted near the outlet. Tilting movement occurs at a moderate differential pressure. At greater differential pressures, a pronounced lifting of the diaphragm can occur by virtue of overcoming the force of spring 32.

The centroid of area of the diaphragm is in the case of a circular diaphragm, the center thereof. As is well known, the centroid is the point at which a force at a single point can balance an evenly distributed oppositely directed pressure upon a body.

A compressible coil spring 32 is seated in a spring receptacle 26 in the upper chamber, and bears against the diaphragm assembly. A spring retainer 33 in the form of a protrusion on the surface of the washer in the upper chamber may be provided to position the base of the spring. The spring is placed above the O ring and outlet port on the opposite side of the diaphragm assembly therefrom, so as to press the washer in the lower chamber down against the O ring. The two supports 21, and the O ring constitute three rest points for the diaphragm assembly, and define its position for closing the outlet port. The stiffened portion of the diaphragm rests against the O ring.

Hold-down bolts 34 are passed through the bolt passages 27 and screwed into bolt receptacles 22 to join the case sections together and clamp the diaphragm between them. Unions 35 are provided for connecting the valve with the drain line and stand pipe, as well as the drain line and stand pipe with the tank.

In Fig. 2 there is shown an alternate arrangement of the drain line and stand pipe which avoids the necessity of side-tapping the tank. According to this embodiment, the drain line 36 is connected between the bottom of the tank 10 and the inlet port 16 of the lower case section as before. Also, the stand pipe 37 is connected to inlet port 25 of the upper case section. However, the stand pipe, instead of being connected through the side of the tank, enters the drain line near the valve, and passes upwardly inside the drain line, ending at a level above the end of the drain line. The end of the stand pipe in this embodiment will be disposed at approximately the same relative level with respect to the drain line as is shown in Fig. 1.

Screens 38 may be placed in the drain lines and stand pipes to keep grit out of the valve.

The operation of the valve will now be described. In Fig. 1, the valve is shown in a closed position, which position results when the pressures in the upper and lower chamber are substantially equal. Of course, the weight of the diaphragm washers 29 and 30 and the fastener, along with the spring force, provide a certain amount of bias force tending to keep the diaphragm in a downward position. However, this bias force need not be large compared with the other pressures involved. Furthermore, the spring may be dispensed with, if desired, since the weight of the backing members will serve to bias the diaphragm to a downward position.

If the liquids in both the stand pipe and the drain line are of the same specific gravity, then the pressures in the upper and lower chambers will be substantially equal. This is because the heights of the liquid columns are equal for all practical purposes, these heights being defined by the same liquid level in the tank, and the difference between the elevations of the portions of the diaphragm bounding each chamber being no larger than the thickness of the diaphragm assembly. This thickness is small compared to the other dimensions of the liquid system. Thus the tendency of the diaphragm, even without the spring, is to seat itself on the O ring and on the supports 21 so as to close the opening 17 when the specific gravity of the liquids in the columns leading to both chambers are substantially equal.

However, suppose that water or some other liquid of density heavier than the upper fluid has gotten into the tank. Then this denser liquid will settle into the drain line. The stand pipe, with its upper end above the level of the denser liquid, will continue to be filled only with the less dense liquid. Therefore the pressure in the lower chamber to which the more dense liquid settles will be greater than the pressure in the upper chamber. This is a consequence of the fact that in a hydraulic environment the unit pressure ($p$) is related to the depth ($h$) and to the specific gravity ($\rho$) by the equation $p=kh\rho$, $k$ being a constant factor. Therefore, since both conduits are of equal height, the pressure will be greater in the conduit having the liquid of greater specific gravity.

This larger pressure creates a pressure differential which will lift the diaphragm off the O ring in the manner shown in Fig. 2. It will be observed that since the O ring and its boss are placed near one side of the lower chamber and this side is spring loaded down, the initial movement will be a tilting one. The force on the center of the diaphragm creates a moment tending to tilt it. This tilting moment exerts a large leverage so that the diaphragm can pivot on one edge of the O ring, and this enables the drain port to be opened by a smaller differential force than if the entire diaphragm assembly had to be lifted directly up. In the event that there is a comparatively large differential pressure, the construction of this diaphragm does permit the entire diaphragm assembly to be lifted up.

After the denser liquid has been emptied through the outlet, and the chamber pressures again are substantially equal due to the balancing of pressures in the stand pipe and drain line, then the diaphragm will again drop onto the O ring and the supports 21 to close the drain port. This closing movement can result from the weight of the diaphragm alone, although it is preferable to utilize the spring for its positive-seating feature. Either with or without the spring the pressure in vessel 10 tends to hold the valve seated.

It will be appreciated that the difference in chamber pressure at the upper and lower faces of the diaphragm can be made small, inasmuch as the difference in elevation of these faces need be no greater than the thickness of the diaphragm assembly. Therefore this valve is balanced at any system pressure, and will operate independently of these system pressures.

The net force for moving the diaphragm results from a difference in specific gravities between the two liquid columns. The valve can operate on a low pressure differential, particularly when the diaphragm is tiltably arranged so as to tilt when it first opens. Denser liquids are removed as they settle out and the differential pressure will not build up to excessive pressures due to a large accumulation of denser liquid. The diaphragm can then be made light and thin and therefore more flexible than if a larger pressure differential had to be resisted by it.

This separator valve thus provides a simple, convenient and automatic means which requires no attention for its operation of draining a fluid of one density from another fluid of a different density. There is only one moving part, and it is merely a moveable diaphragm assembly. A given one of these valves can be installed for a wide range of system pressures, and the operation of the valve will be independent of the absolute system pressure.

This invention is not be limited by the embodiment shown in the drawings and described in the description, but only in accordance with the scope of the appended claims.

I claim:

1. A valve for separating fluids of different densities comprising a casing having an internal cavity defined by an interior wall, an imperforate diaphragm having a centroid of area and comprising a flexible portion and a stiffened portion, said diaphragm being disposed in said cavity and having its entire periphery in sealing contact with said wall and extending across the cavity to divide the cavity into a first chamber and a second chamber, the stiffened portion being spaced from the wall and connected thereto by the flexible portion, each chamber having an inlet through the casing, and the first chamber having an outlet through the casing, the outlet having an opening facing the diaphragm, the stiffened portion and the outlet being so disposed relative to one another that the stiffened portion abuts the outlet at a location on the diaphragm which is spaced a substantial distance from the centroid, with the stiffened portion making a sealing contact with the outlet and thereby closing the opening when pressures in the chambers are substantially equal, said location lying between the centroid and the wall, the stiffened portion being free to move toward said second chamber, at least at all points of the stiffened portion which are significantly spaced from the outlet and from the wall, thereby opening the outlet to drain fluid from the first chamber when pressure is substantially greater in the first chamber than in the second chamber.

2. A valve according to claim 1 in which a leveling support is provided in the first chamber which is so disposed and arranged that when pressures in the first and second chambers are substantially equal, the stiffened portion rests on the outlet and on the leveling support, the outlet and leveling support thereby determining the position of the stiffened portion when it closes the opening.

3. A valve according to claim 1 in which the outlet includes a washer surrounding said opening to make sealing contact with the stiffened portion for closing the opening.

4. A valve according to claim 1 in which springing means are placed in said second chamber in compressive opposition between the wall and the stiffened portion, which springing means are so disposed and arranged as to bias the stiffened portion toward the outlet.

5. A valve according to claim 1 in which the centroid lies within the stiffened portion.

6. A valve according to claim 1 in which springing means are placed in said second chamber in compressive opposition between the wall and the stiffened portion, which springing means are so disposed and arranged as to bias the stiffened portion toward the outlet, and in which a leveling support is provided in the first chamber which is so disposed and arranged that when pressures in the first and second chambers are substantially equal, the stiffened portion rests on the outlet and on the leveling support, the outlet and leveling support thereby determining the position of the stiffened portion when it closes the opening.

7. A valve according to claim 6 in which the outlet includes a washer surrounding said opening to make sealing contact with the stiffened portion for closing the opening.

References Cited in the file of this patent

UNITED STATES PATENTS

| | | |
|---|---|---|
| 602,657 | Franklin | Apr. 19, 1898 |
| 766,420 | Calley | Aug. 2, 1904 |
| 779,316 | Robinson | Jan. 3, 1905 |
| 2,610,645 | Wagner | Sept. 16, 1952 |
| 2,638,109 | Wahlmark | May 12, 1953 |
| 2,678,065 | Crookston | May 11, 1954 |

FOREIGN PATENTS

| | | |
|---|---|---|
| 25,910 | Switzerland | Mar. 7, 1902 |